INVENTOR
WILLARD A. KATES
BY Hofgren, Wegner, Allen, Stellman & McCord ATTORNEYS United States Patent Office 3,402,735
Patented Sept. 24, 1968

3,402,735
FLOW REGULATING APPARATUS
Willard A. Kates, Deerfield, Ill., assignor to The W. A. Kates Company, a corporation of Illinois
Original application Jan. 4, 1963, Ser. No. 249,379, now Patent No. 3,223,115. Divided and this application Sept. 23, 1965, Ser. No. 489,593
6 Claims. (Cl. 137—501)

ABSTRACT OF THE DISCLOSURE

A fluid flow regulating device wherein a spring biases a piston in a cylinder. The piston has radial clearance with the cylinder wall and the device includes structure for shifting the action of the spring end against the piston tending to center the piston relative to the cylinder.

This invention is a division of Kates patent application Ser. No. 249,379, filed Jan. 4, 1963, entitled, "Flow Regulating Apparatus" (now Patent No. 3,223,115).

This invention relates to flow control apparatus employing a piston and also relates to the manufacture thereof. The invention further relates to a fluid flow control device of the type utilizing a reciprocating piston.

In the design and manufacture of fluid control regulators, it is important to provide smaller regulators for given gallonage ratings. Regulators utilizing a piston as a combination force and valving element give the advantage of compactness for given gallonage. Such regulators usually include a cylindrical fluid passage or cylinder and a generally cylindrical free piston valving member axially reciprocal within the cylinder responsive to pressure differences at the two ends of the cylinder. The reciprocating piston regulates the rate of flow through the device by being normally biased toward the higher pressure end of the cylinder and being movable by increased pressures against the biasing to restrict outlet ports from the low pressure end of the cylinder, the flow of fluid through the device being through a restricted bypass from the high pressure to low pressure ends of the cylinder.

However, free pistons tend to stick in the regulator cylinder, apparently without regard to the care and finishing of the piston and the cylinder bore. Some well finished pistons and cylinders will give excellent operation while others which are finished in the same manner and to the same degree appear to provide constant sticking problems. Many approaches have been taken in overcoming the sticking and inconsistency in operation with little or no corrective results.

It is the general object of the present invention to provide a new and useful fluid control device and a new and useful piston which may be used in such control devices.

Another object of this invention is to provide a piston in accordance with the foregoing object which is more readily reciprocable in a cylinder or bore and which has less tendency to stick within the cylinder.

A further object of the invention is to provide a free piston in a fluid flow regulating device, which piston is tapered at its ends to provide a circumferential angular surface on each end of the piston, angular with respect to the cylinder wall, and sufficient to draw fluid flowing through the device between the reciprocally sliding surfaces to prevent sticking of the piston in the cylinder.

Still another object of this invention is to provide a device in accordance with the foregoing objects wherein the piston includes means maintaining a more linear pressure gradient between the piston and cylinder walls from one end of the piston to the other.

An additional object of this invention is to provide a new and useful method of manufacture of the piston or fluid control regulator device of any of the foregoing objects.

Other and further objects of the present invention will be readily apparent from the following description and drawings, in which.

Figure 1:
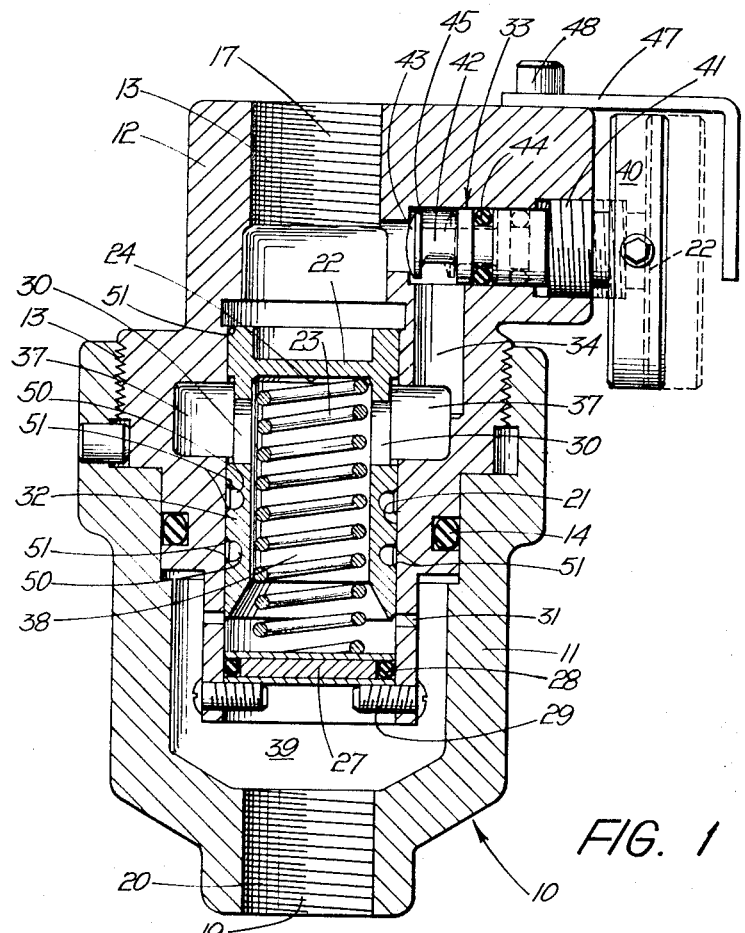
FIGURE 1 is a cross-sectional view of a new and useful fluid regulating device utilizing a free piston in accordance herewith.

In fluid flow regulating devices utilizing a reciprocating piston, flow of a fluid is regulated to provide a relatively constant output from an input which may fluctuate. The fluid, such as water, passed through the device is used to lubricate the reciprocating piston and cylinder surfaces. A film of the fluid is laid down on the cylinder wall for lubricating purposes. Normally the piston, being slidably fitted within the cylinder with sufficient room for formation of the lubricating film, may cant during its reciprocation. It is believed that during the reciprocal travel of the piston within the cylinder, the canted piston provides leading edges which tend to scrape the film of lubricating fluid from the cylinder wall. The present invention eliminates the tendency toward sticking from such scraping action by greatly decreasing the scraping action itself.

While this invention is susceptible of embodiment in many different forms, there is shown in the drawings and will herein be described in detail a specific embodiment of the invention and modifications thereof, with the understanding that the present disclosure is considered to be an exemplification of the principles of the invention and is not intended to limit the invention to the embodiment or modifications illustrated.

Referring now to the drawings, a flow regulating device indicated generally at 10 includes a casing having a lower fitting portion 11 and a cap fitting 12 secured together by a threaded connection 13. An annular seal 14 is provided between the two fittings to inhibit leakage therebetween. The regulator device has an inlet 17 provided with female threads 18 for connection to a high pressure fluid flow line and an outlet 19 provided with female threads 20 for connection to a lower pressure line.

Within regulator 10 there is provided a cylinder 21 having a free piston 22 freely slidable therein. Piston 22 is urged upward by a compression spring 23 which seats on an inner surface 24 of piston 22 and is grounded on plate 27. Plate 27, a disc with a circumferential groove, is sealed with respect to the walls of cylinder 21 by means of O-ring 28 in the groove of plate 27. Plate 27 is held against downward urging by mounting means such as bolts 29. Piston 22 is provided with ports 30 through the wall thereof and cylinder 21 is provided with a plurality of annular disposed bores 31 through the cylinder wall adjacent the piston skirt 32. A valve indicated generally at 33 is provided for controlling the flow of fluid from inlet 17 through passage 34 and into annular chamber 37 which communicates through ports 30 with the interior hollow portion or chamber 38 of piston 22. Bores 31 communicate interior piston chamber 38 with outlet chamber 39.

Valve 33 includes a valve handle 40 which may be turned to open and close the valve. Handle 40 is mounted on a plunger 42 which is threaded at 41 in fitting 12 and which extends inward and carries a seating surface 42 on its inner end. Plunger 42 is in sealed relation in the plunger bore and O-ring 44 is provided to inhibit escape of fluids between the plunger and bore. Seating surface 43 is disposed against seat 45 at its inner limit of travel sealing passage of fluids through the opening defined by seat 45. The inner position of the valve member is shown in heavy lines. In withdrawn position, as shown in dotted lines, plunger 42 is withdrawn by unthreading at 41 by means of valve handle 40 to the position shown in dotted lines. Positions intermediate the seated position and fully withdrawn position are, of course, possible in the usual manner of valve manipulation. A stop member such as bar 47 may be provided if desired to prevent accidental complete withdrawal of the valve member by disengagement of threads 41. Bar 47 may be mounted to fitting 12 by suitable mounting means shown at 48.

With valve 33 in open position, fluid flows through inlet 17, passage 34, chamber 37, ports 30, chamber 38, bores 31, chamber 39 and outlet 19. Handle 40 is adjusted to give the desired amount of flow from outlet 19. As fluid enters chamber 38, because of the pressure drop across valve 33, a force is exerted upon piston 22 tending to move it downward thereby to bring the lower edge of the skirt 22 across bores 31. Such movement of the piston is resisted by means of compression spring 23. Movement of the piston downward throttles ports 31 reducing the total flow through the device until the pressure drop across valve 33 is offset by the bias of spring 23, i.e. by increased pressure within chamber 38 relative to the pressure at inlet 17. Thus, any changes in upstream pressure will cause corresponding movement of piston 22 downward in case of increased pressure and upward in case of decreased pressure, so as to maintain the flow through outlet 19 at a constant predetermined value regardless of such changes in inlet pressure. The constant predetermined value or flow rate is obtained by adjustment of value handle 40.

A plurality of annular grooves 50 is provided in the circumferential surface of piston 22. Grooves 50 function as means maintaining a more linear, and preferably a substantially linear, overall pressure gradient between the piston and cylinder walls from one end of the piston to the other. The function of the grooves will be described in more detail hereinbelow.

Piston 22 is tapered at the edge of each groove and each end as indicated by reference number 51 in FIGURE 1. The tapers are of sufficient angle and length to provide a circumferential angular surface on the piston at each edge of the piston between the piston and cylinder wall sufficient to draw fluid between the reciprocating sliding surfaces and prevent sticking of the piston in the cylinder. The angle of each of the tapers is an angle which is insufficient to scrape the lubricating film of fluid normally present on the cylinder wall during reciprocal travel of the piston.

Although the piston of this invention has been illustrated and described above in a particular valve device, it is to be understood that the piston is useful in many forms of valves and the like. For example, the piston, with slight modification in form, is usable in the fluid flow regulator described by me in U.S. Patent 2,984,261, patented May 16, 1961, and may also be usable in accordance with the design described by Alfred H. Viergutz in U.S. Patent 2,859,769, patented Nov. 11, 1958. Other uses for the piston will be apparent to those in the art.

Figure 2:
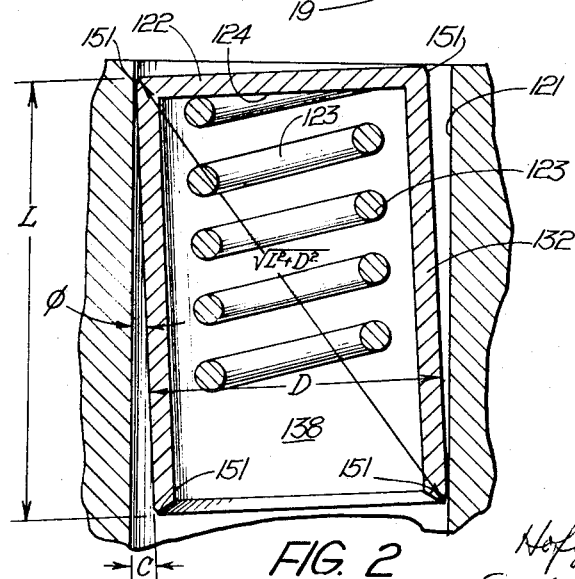
FIGURE 2 is a cross-section of an embodiment of a piston within a cylinder bore of a fluid regulating device in accordance herewith with the piston cant exaggerated for better understanding.
Figure 3:
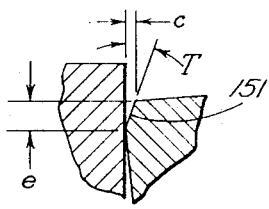
FIGURE 3 is an enlargement of a portion of FIGURE 2 for better illustration of the tapered piston ends.

Turning now to FIGURES 2 and 3, there is illustrated another form or modification of a piston usable in accordance with the present invention. Accordingly, piston 122 is provided in cylinder 121 and is urged upward by compression spring 123 and downward by the pressure differential between the top of piston 121 and surface 124, i.e. the pressure differential over the length of the piston. The edge at each end of piston 122 has been tapered or chamfered at 151, e.g. at an angle of approximately 3° to 5° for a short distance back from each end. The distance, e.g. ⅜₄ inch in the illustrated embodiment, may vary generally as much as desired; however, in general, the length of the chamfer or angular surface will depend somewhat upon the ratio of length of the piston to diameter of the piston and upon the fluid wetting and viscosity characteristics of the fluid. Further, in general, the less clearance between piston and cylinder walls, the greater the length of bevel which can be provided. The angle or angular surface exists at each end of the piston to provide an angle between the piston and cylinder wall so that when the piston is in any position off-center or twisted so that it would normally tend to bind, there is an anguluar surface which will direct lubricant between the piston and cylinder walls. Thus, instead of scraping the lubricating film from the cylinder wall, the piston will tend to ride on a fluid film and sticking of the piston due to scraping of the film will not result.

The piston in FIGURES 2 and 3 is illustrated in cross section in a cylinder with the axis of the piston at an angle to the axis of the cylinder. The angle of the two axes may be described as an angle whose tangent is the quantity $C/(L-e)$. Usually the dimension $e$ is small relative to length $L$ and the above quantity may be replaced without substantial error by the quantity $C/L$. In such case, the maximum angle of cocking of a piston in the cylinder may be described as the angle whose tangent is a ratio of the diametric piston clearance to the length of the piston.

Referring now more particularly to FIGURE 3, it will be noted that if the end of the piston is not tapered, there would be a tendency for the end to dig or wedge into the cylinder wall when the piston is reciprocated upward. If the upper end of the piston is beveled at angle T just equal (not shown) to the angle at which the piston is cocked in the cylinder, theoretically there should be no digging in and the end of the piston should slide smoothly on the cylinder wall. Also, theoretically there would be no room for fluid and there would be no tendency for the end of the piston to slide on a film of lubricating fluid. The end of the piston would still tend to scrape or wipe the liquid before it as it travels upward.

Where the piston is beveled so that angle T is greater (as shown in FIGURE 3) than the maximum angle of cocking of the piston in the cylinder by a relatively few degrees, there will be no tendency for the end of the piston to dig into the cylinder wall and the end of the piston will tend to slide over the cylinder wall and a film of lubricant forms by the combination of surface adhesion and compression action between the beveled or tapered surface of the piston and the cylinder wall. Of course, any curved surface or beaded end could be used in lieu of the conical section surfaces illustrated as the angled or beveled surface on the piston ends.

The minimum angle to prevent sticking, in a preferred embodiment of this invention, can be specified as the angle whose tangent is $C/L-e$, where:

L is the length of the piston,
C is the distance of one end of the piston, in the absence of such taper, from the cylinder wall in the radial plane of the cylinder including the point of contact of the tapered other end with the cylinder wall with the piston at maximum cant within the cylinder, and
e is the perpendicular distance from said point of contact of said tapered other end to the plane of said other end, and wherein said angle is insufficient to scrape said lubricating film of fluid from the cylinder wall by reciprocal travel of the piston, said circumferential grooves in the cylinder surface of sufficient number and dimension to maintain a substantially overall pressure gradient between said piston and cylinder and from one end of said piston to the other, thereby minimizing cocking of the piston in the cylinder. Often, if not usually, the distance $e$ is negligible compared with L and the tangent of the minimum angle can be expressed as $C/L$. Any greater angle may effectively be used which is not too great to again cause the scraping action. The maximum angle will depend, of course, to a large extent upon the lubricity of the fluid flowing through the valve and upon its surface wetting characteristics.

Figures 4, 5, 6:
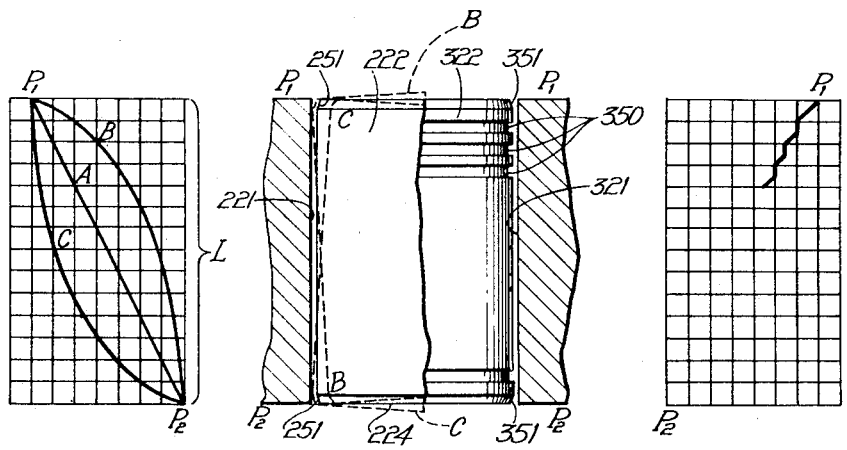
FIGURE 4 is a diagrammatic illustration of a piston with and without circumferential grooves in the piston side wall with the piston disposed in a cylinder at an exaggerated cant.
FIGURE 5 is a graphic representation of the pressure differential distribution of a piston without side wall grooves.
FIGURE 6 is a graphic representation of the pressure differential distribution of a piston with side wall grooves.

The discussion with reference to FIGURES 1-3 was directed to the performance of a piston which becomes cocked in a cylinder. In another modification of the present invention, the reliability of the valve or regulator device may be enhanced if the piston is also provided with means acting against the cocking forces. Referring now to FIGURE 4, two pistons are illustrated each co-axial within the cylinder as shown in full line. With respect to each of pistons 222 and 322 illustrated in FIGURE 4, when a pressure differential ($P_1$ minus $P_2$) is maintained between the upper ends 222 and 322 and the lower ends 224 and 324 of the pistons, the pressure gradients will be uniform and the distribution of pressure between the two ends of each piston will be represented by the line A on the curve of coordinates in FIGURE 5.

Referring now to FIGURES 4 and 5 and assuming that piston 222 is cocked to position B, i.e. with the upper left corner against the cylinder wall, within cylinder 221, the drop in pressure closer to the piston head will be relatively sharp and the pressure distribution will approximate curve B in FIGURE 5. If the piston is cocked in the opposite direction, i.e. to position C, the pressure distribution will tend to approximate the curve C of FIGURE 5. It will be appreciated that if the pressure gradient along the cylinder can be artificially maintained by some means the piston will tend to remain central in the cylinder and will reciprocate more freely.

Referring now to FIGURES 4 and 6, piston 322 is provided with means for maintaining a relatively uniform pressure gradient between ends 322 and 324 and, therefore, means for maintaining the central piston position. Accordingly, a plurality of circumferential grooves 350 are proivded on the outer surface of piston 322. The grooves may vary in width and depth but their dimensions are preferably such that they maintain the circumferential fluid conductivity substatnially higher than the axial fluid conductivity over the length of the piston. The circumferential circulation of the fluid is relatively free and the pressure causing the circumferential circulation is low relative to the pressure necessary to cause fluid circulation axially in the clearance space between piston 322 and cylinder wall 321.

Referring now to FIGURES 4 through 6, in the case of the grooved piston 322, provided with self-centering action by means of the grooves, assuming cocking of the piston, the side of the piston having the pressure gradient of curve C of FIGURE 5 will have pressures at all points greater than those on the side having the pressure gradient of curve B at an equal distance from the top of the piston. This pressure difference will cause flow circumferentially through the piston grooves but the flow creates a pressure difference causing the piston to tend to move toward the center of the cylinder. Referring particularly to FIGURE 6, it will be seen that the effective action of the series of grooves is to maintain the pressure gradient in an approximately straight line between the two ends of the piston. Under these conditions, the piston will tend to remain centrally located in the cylinder.

The circumferential flow and spacing between the piston and cylinder walls provide leakage of fluid between the piston ends from the high pressure end to the low pressure end. The total leakage will be affected by the number of grooves and the clearance between the piston and cylinder. The clearance and number of grooves may be varied within a substantial range to give greater or less leakage without substantially upsetting the pressure gradient and the concentric positioning of the piston is still assured. In designing grooves for use in regulators to handle specific fluids, it may be advisable to take into consideration the fluidity or viscosity of the fluid, its wetting characteristics, and the like as well as the length of piston, clearance and ratio of diameter to length of the piston.

In forms of the piston, e.g. as shown in FIGURES 1 and 4, it may be desirable to provide tapered surfaces on the piston outer surface adjacent and in lieu of a square edge for each groove. Such tapers have been described with reference to FIGURE 1. Where the grooves are narrow, e.g. $\frac{1}{16}$ inch in width, the grooves will usually not contribute to the scraping of lubricant film from the cylinder wall and tapering of such grooves may serve no paritcular advantage. However, with wider grooves, e.g. on the order of $\frac{1}{8}$ inch to $\frac{3}{16}$ inch or wider, I have found that the grooves do appear to scrape the lubricant film from the wall and better performance with the piston may often be obtained with a slight taper adjacent the edge of each groove, e.g. a 3° to 5° taper.

Figure 7:
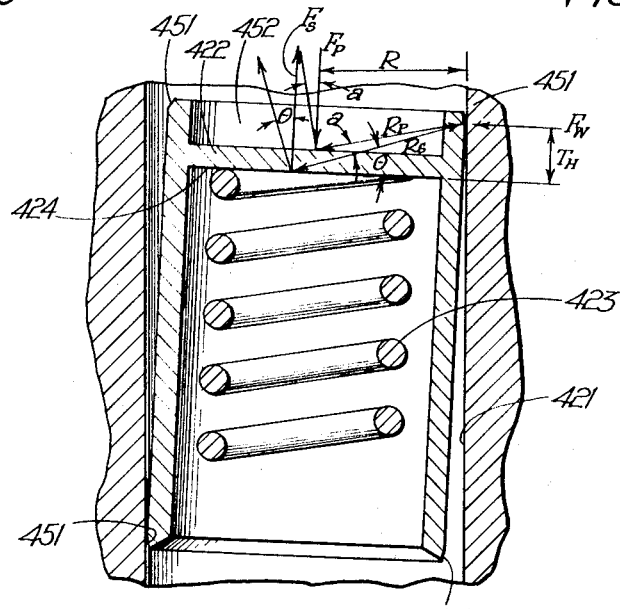
FIGURE 7 is a vertical section through another form of a piston of the present invention disposed in a cylinder.

Referring now to FIGURE 7, there are shown additional means tending to create a relatively uniform or more linear pressure differential from one end of the piston to the other. FIGURE 7 shows the balance between another set of forces tending to position a free floating piston with respect to the cylinder wall. The differential pressure across the head of the piston acts against the top surface of piston 422 tending to force the piston downward. The differential pressure force is represented by a vector $F_p$ at the center of the piston head. The force tending to drive the piston upward is that of spring 423, which is ground flat to abut against surface 424. Taking into consideration the variance in cantilever beam action of the spring, the upward force of the spring is represented by a vector $F_s$ upward and parallel to, but removed from the piston axis. Such eccentricity of application of the force tends to rotate the piston about point $F_w$ as shown in FIGURE 7. $F_w$ is the point at the top of the piston and at the lower end of the tapered portion 451.

Assuming the piston is at rest, and assuming that there is to be no binding or friction of the piston on the cylinder at the open end of the piston, the summation of moments about the point $F_w$ must be zero, and also the axial force summation must be zero. Stated in equation form, $$F_s R_s \cos \theta - F_p R_p \cos a = 0$$

and $$F_p - F_s = 0$$

If these two equations are to be true simultaneously, $R_s$ cosine $\theta = R_p$ cosine $a$.

Since pistons are usually circular, the locus of $F_p$ is the piston axis and $R_p$ will be defined by the top surface of the piston and $F_w$. $F_w$ is considered as the point of contact between piston and cylinder wall and it will be readily apparent that many such points exist. The plane of point $F_w$ is the plane perpendicular to the piston axis. It will thus be seen that "$R_p$ cosine $a$" may be varied by changing the position of the piston head relative to the point $F_w$; also the product "$R_s$ cosine $\theta$" can be changed by modifying the thickness of the piston head, or by changing the details thereof, or by changing the details of the spring.

Regarding the first equation it is advantageous to reduce the torque or summation of moments to zero and it is apparent that this could theoretically be done by anjusting any one of four values. However, in an advantageous form of the present invention, it is preferred to adjust $R_p$ or $R_s$ to more nearly the same value in that such adjustment can be used to satisfy both equations. As an example, considering $R_s$, the center of spring pressure can be made to approximate the piston axis by providing spring 423 ground at its upper end, i.e. the end reacting against surface 424, at an angle other than 90° to its axis, thereby increasing the stiffness of the end coil of the spring as a cantilever beam.

As one means of changing the torque caused by $F_s$, it can readily be seen that the thicker the piston head, and the further the piston head is above the plane of point $F_w$, the greater will be the piston unbalance. Conversely the further the piston head lies below the plane of $F_w$, the more nearly will "$R_p$ cosine $a$" approroximate "$R_s$ cosine $\theta$"; the two will never exactly equal because of the thickness of the piston head. However, the larger the distance $T_h$, the more expensive the overall piston design becomes. Thus, if the piston head 422 is located so that its top surface is below the plane of $F_w$ and if the piston head is made of minimum necessary mechanical thickness, the more nearly will the two terms have the same value. In view of the above, in one advantageous embodiment of the present invention, the top of the piston head is disposed below the plane of contact of the top piston wall width the cylinder wall and the thickness of the piston head is preferably of the minimum necessary mechanical thickness.

Modifications of the piston can be made wherein the forces causing piston unbalance, i.e. by inequality of two or more forces and/or the inequality of moments of these forces about a bearing point on the outer surface of the piston, are themselves modified and/or their effective point of application are modified. Examples of such modifications are illustrated in FIGURE 8 through 11.

Figure 8:
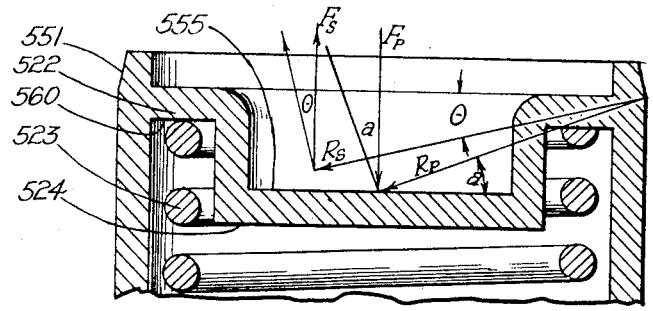
FIGURES 8 through 11 are each sections of the head portion of modified pistons otherwise similar to the piston shown in FIGURE 7.

In FIGURE 8, the piston is provided with modified effective locus of force application in the form of a depressed center area 555 in the piston head so that the differential pressure between area 555 and surface 524 is applied to the piston below the bearing surface 560 of spring 523. By properly proportioning the depressed area, it is apparent that the effect of the eccentric spring force may be neutralized. The construction shown in FIGURE 8 is advantageously applicable especially to relatively large pistons.

Figure 9:
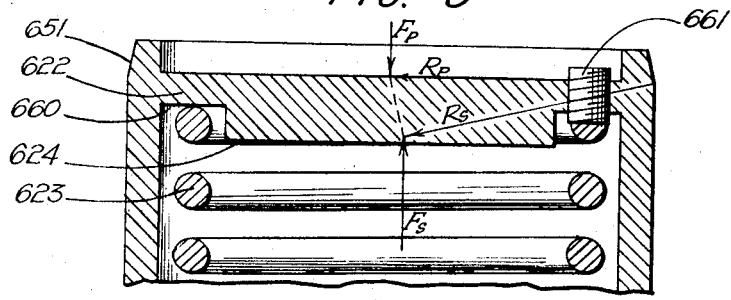

FIGURE 9 illustrates a form of piston wherein the center of application of the force $F_s$ of spring 623 is shifted nearer to the piston axis, e.g. a little beyond the piston axis and to the right thereof as shown in FIGURE 9. The shifting of $F_s$ is accomplished by means of an adjustable shim such as set screw 661 which is located at a point on the end turn of spring 623 opposite the commencement of the ground flat area of the end turn. By adjustment of the set screw, the axis of effective application of $F_s$ may be shifted so that $F_s \times R_s = F_p \times R_p$. This modification in the piston is also more advantageously usable with relatively large pistons.

Figure 10:
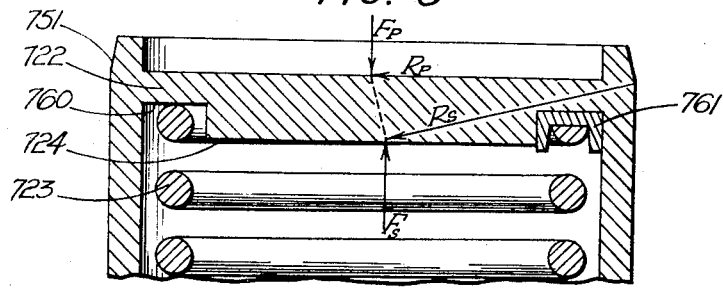

In the piston of FIGURE 10, the axis of $F_s$ is shifted nearer to the piston axis by means of a shim 761 located similarly to the set screw described in FIGURE 9. This method is inexpensive and should be applicable to all sizes of pistons.

Figure 11:
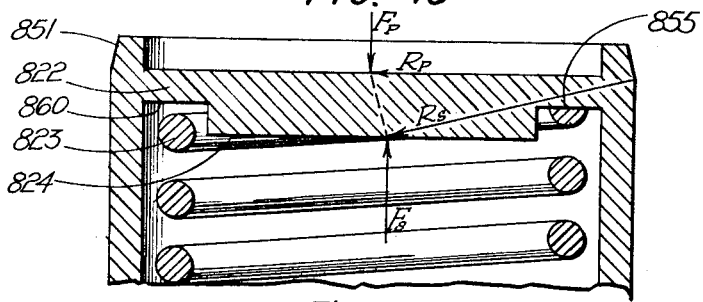

In the form of piston illustrated in FIGURE 11, the shift of force $F_s$ is effected by bending the end coil of spring 823 as at 855 so that eccentric loading is obtained sufficient to shift $F_s$ nearer to the piston axis as illustrated. Force $F_s$ is thus shifted in appropriate relation with $F_p$. This modification is again applicable to all sizes of pistons.

I claim:

1. In a fluid flow regulating device including a cylinder, a free piston and spring means generally coaxial of said piston and having a flat end engaging said piston for urging said piston in said cylinder, there being sufficient radial clearance between the piston and cylinder to permit canting of the piston and spring in the cylinder normally due to unbalanced urging of said spring, the improvement in said device which comprises means at said flat end of the spring means for shifting the direction of action of said spring end against said piston away from the direction of canting and thereby augmenting the normal urging of said spring tending to decrease canting of said piston.

2. The device of claim 1 wherein said spring force shifting means comprises means shifting the center of application of the spring force nearer to the piston axis.

3. In a fluid flow regulating device including a cylinder, a free piston and spring means generally coaxial of said piston and having a flat end engaging said piston for urging said piston in said cylinder, there being sufficient radial clearance between the piston and the cylinder to permit canting of the piston and spring in the cylinder normally due to unbalanced urging of said spring, the improvement in said device which comprises means at said flat end of the spring means for shifting the direction of action of said spring end against said piston away from the direction of canting and thereby augmenting the normal urging of said spring tending to decrease canting of said piston, said spring force shifting means comprising means shifting the center of application of the spring force nearer to the piston axis, said spring force shifting means being disposed at said piston.

4. In a fluid flow regulating device including a cylinder, a free piston and spring means generally coaxial of said piston and having a flat end engaging said piston for urging said piston in said cylinder, there being sufficient radial clearance between the piston and the cylinder to permit canting of the piston and spring in the cylinder normally due to unbalanced urging of said spring, the improvement in said device which comprises means at said flat end of the spring means for shifting the direction of action of said spring end against said piston away from the direction of canting and thereby augmenting the normal urging of said spring tending to decrease canting of said piston, said spring end being defined by a flat end turn and the spring force shifting means comprising a shim means disposed between the piston and said flat end turn of the spring and located opposite the commencement of the flat spring end turn.

5. In a fluid flow regulating device including a cylinder, a free piston and spring means generally coaxial of said piston and having a flat end engaging said piston for urging said piston in said cylinder, there being sufficient radial clearance between the piston and the cylinder to permit canting of the piston and spring in the cylinder normally due to unbalanced urging of said spring, the improvement in said device which comprises means at said flat end of the spring means for shifting the direction of action of said spring end against said piston away from the direction of canting and thereby augmenting the normal urging of said spring tending to decrease canting of said piston, said shim means being adjustable for moving the flat spring end turn selectively toward or away from the confronting piston surface.

6. The device of claim 1 wherein said spring force shifting means comprises a bent flat end turn of said spring, the bend being in a direction parallel to the spring axis suitable to shift the center of application of spring force nearer to the piston axis.

References Cited

UNITED STATES PATENTS

| | | | |
|---|---|---|---|
| 2,232,267 | 2/1941 | Price | 137—500 XR |
| 2,813,401 | 11/1957 | Smith | 137—117 XR |
| 2,888,949 | 6/1959 | Evans | 137—505.25 |
| 2,896,662 | 7/1959 | Thomas | 251—325 XR |
| 2,917,074 | 12/1959 | Terry | 137—504 |
| 2,984,261 | 5/1961 | Kates | 137—504 XR |
| 3,005,463 | 10/1961 | Van Meter | 137—504 XR |
| 3,027,913 | 4/1962 | Chatham et al. | 251—337 XR |
| 3,074,428 | 1/1963 | Mancewicz | 251—337 XR |
| 3,146,719 | 9/1964 | Dratchas | 137—117 XR |
| 3,159,350 | 12/1964 | Mangold | 137—509 XR |

FOREIGN PATENTS 16,499  7/1910  Great Britain.

M. CARY NELSON, *Primary Examiner.*

ROBERT J. MILLER, *Assistant Examiner.*